(No Model.)

T. SHAW.
Centrifugal Machine.

No. 238,536. Patented March 8, 1881.

WITNESSES:
Wm B Hughes
Wm Garwood

T. Shaw INVENTOR

UNITED STATES PATENT OFFICE.

THOMAS SHAW, OF PHILADELPHIA, PENNSYLVANIA.

CENTRIFUGAL MACHINE.

SPECIFICATION forming part of Letters Patent No. 238,536, dated March 8, 1881.

Application filed January 27, 1881. (No model.)

*To all whom it may concern:*

Be it known that I, THOMAS SHAW, of the city and county of Philadelphia, Pennsylvania, have invented a new and Improved Continuous-Process Centrifugal Machine for Draining Sugar and other Similar Substances; and I hereby declare the following to be a full, clear, and exact description of the same, reference being had to the accompanying drawings, and to the letters of reference marked thereon.

My invention consists in feeding and ejecting the material operated upon in the manner and for the purpose hereinafter described.

The object of the invention is to produce a practical continuous process of operation in centrifugal machines upon sugars or other similar substances susceptible of being operated upon in centrifugal machines, in order to produce a more uniform product in regular time and to expedite the work with economy.

In order to enable others to use and practice my invention, I will proceed to describe its construction and operation.

Figure 1:
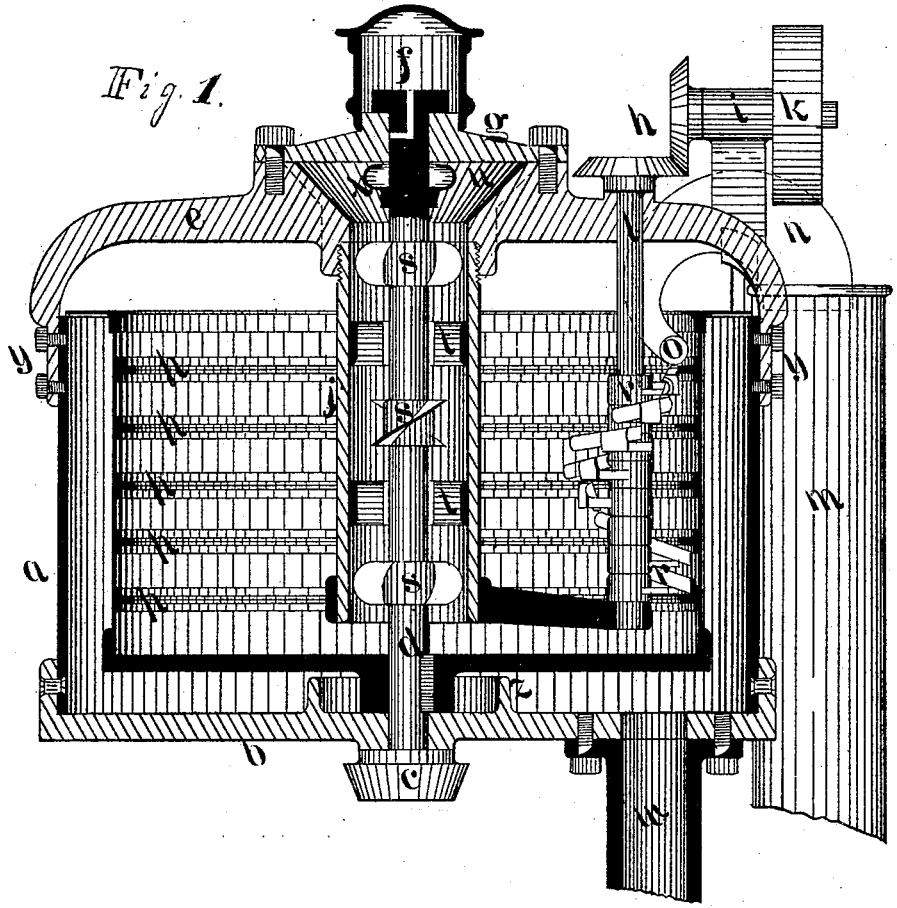

On reference to the accompanying drawings, which form part of this specification, the sketch Figure 1 represents a vertical section through center of the centrifugal machine, of which—

$a$ is the metal stationary cylinder, provided with cast-metal base $b$, located on any suitable support, and has a drain-pipe, $w$, connected with same, as shown.

$z$ is a cast-iron lip projecting from base to prevent drainage of liquid into journal.

$d$ is the vertical shaft, on which the rotating cylinder shown revolves, the cylinder being keyed to the shaft at its base at $d$. The lower journal of shaft being located in the base of outer cylinder, $b$, said shaft is provided with a frictional pulley, $c$, to rotate the same from any source of power. The upper journal of said shaft is located in center of beam $g$, that is secured firmly by bolts shown to top of hopper $u$, that is part of cast-iron arch-beam $e$, said beam being secured firmly to outer cylinder, $a$, by bolts shown at $y$. The said upper journal of shaft $d$ is shown in section to expose oil-passage in the center of oil-cup $f$, and an oil catch-cup, $x$, of the annular chamber configuration shown, to catch and hold any escaping oil and prevent its escaping from the journal into the material operated upon. The rotating cylinder is constructed on its exterior with the usual perforated sheet metal to permit the escape of fluids in the usual manner, and is further provided with metallic ribs $p$, for the purpose of interrupting the upward flow of material operated upon, as hereinafter explained.

$j$ is a pipe secured to and projecting downward from beam $e$. Said pipe has secured to it stationary winged journals $t$. Said wings are ordinary screw-propeller wings secured to rim, which is riveted to said pipe $j$, and the shaft rotates in the central hub of the same, for the purpose hereinafter described.

Figure 2:
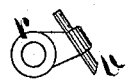

$s\ s\ s$ are three screw-propellers secured to and rotated with shaft $d$, to co-operate with stationary propeller-wings $t$ of reverse angle to screw and force semi-fluids down the pipe $j$ from hopper $u$ into the bottom of rotating cylinder shown, a space being left, as shown, at the bottom for that purpose. The said pipe $j$ has a metal arm secured to and projecting from the bottom of same, to give journal-support to bottom of shaft $l$, the upper journal of which is located in beam $e$, as shown, and is provided on its upper end with cog or frictional gear $h$, actuated through counter-shaft $i$ and belt-pulley $k$ from any source of power. The journal-support of counter-shaft $i$ is a projecting part cast on beam $e$. The shaft $l$ is provided with gouges $v$, Fig. 2, secured to rotating arms $r$ on said shaft $l$, for the purpose of gouging and shifting the material operated upon from the several spaces between the ribs $p$ gradually upward, all for the purpose as hereinafter explained.

$n$ is a bent funnel extending from stationary pipe $m$ in the bent and reduced manner shown, terminating in a narrow and sharp orifice, $o$, for the purpose of receiving the finished product and conveying the same to tube $m$, that furnishes a conduct to any desired place of delivery, all to operate as hereinafter explained.

The machine is operated in this wise: The rotating cylinder connected with shaft $d$ is rotated in the usual manner from any source of power connected with driving-pulley $c$, or otherwise, when the material to be operated upon—sugar, for instance—is fed in any of the usual ways of feeding said sugar to hopper u, from whence it flows upon the first screw-propeller wheel s, which forces it by the screw-wing action down upon the first stationary propeller-wing t, the wings of which being of reverse angle, the material now rotating with propeller s is caused to be thrust downward forcibly through said stationary wing t, treating the material as if it were a bolt and the stationary wings a nut until said material is forced upon the next succeeding rotating propeller s, when a like action occurs between it and the next succeeding stationary propeller until the material be forcibly ejected (if nature of material requires this force) into the afore-described rotating cylinder, where the centrifugal force occasioned by the rapid rotation will cause the material to flow outward and press against the sides of said cylinder and in a semi-fluid condition, and will fill up the space and flow over the first rib p into the next succeeding space provided; but in the meantime the centrifugal force rapidly ejects the fluids from the material which passes off through the perforated rotating cylinder, leaving the material in a condition not to flow, at which time the gouges v, Fig. 2, on arm r of rotating shaft l are brought into play in this wise: The shaft l is rotated in the same direction as the rotating cylinder, but at a less velocity, so that the periods of time at which the gouges are immersed in the material (which material is against the walls of the rotating cylinder) is more or less prolonged, according to the regulated speed, and by reason of the motion of shaft and the cylinder both being in the same direction, excepting the difference in speed, the material is gouged out gradually and continuously from between the spaces of rib p and shifted to a higher elevation, until it is finally ejected at the top. In the meantime the material is turned over frequently by said gouges and exposed with new surfaces, in shallow depths, upon the walls of the rotating cylinder, all of which is favorable for the rapid ejecting of all fluid substances from the solids in the material in a continuous manner as a resultant of this invention. The material, when finished, is caught in the mouth of stationary funnel o and passed into pipe m to any receptacle finished material, so far as centrifugal action is concerned.

The funnel o n is not a necessity, as the described gouges v will eject the material from the machine when required.

The ribs p may be variously modified, and in some cases dispensed with, without any alteration in the result.

It will be evident that the gouges v can be variously fashioned and operated without any alteration in the result. I therefore do not wish to confine myself to the exact configuration or method of operation shown; but What I do claim, and desire to secure by Letters Patent, is—

1. In centrifugal machines, the combination of rotating and stationary propeller-wings s and t with shaft and pipe j, operating in the manner described, for the purpose set forth.

2. The rotating shaft l, in combination with gouges v or arms r, operating on the material in the described rotating cylinder in the manner described, and for the purpose set forth.

3. The receiving-funnel o n, in combination with the rotating cylinder described, and for the purpose set forth.

THOMAS SHAW.

Witnesses:
EZRA LUKENS,
WM. B. HUGHES.